US008100766B2

(12) United States Patent
LeBlanc et al.

(10) Patent No.: US 8,100,766 B2

(45) Date of Patent: Jan. 24, 2012

(54) METHOD AND SYSTEM FOR PERSONALIZED DIGITAL GAME CREATION

(75) Inventors: Marc André LeBlanc, Berkeley, CA (US); Andrew Jonathan Leker, San Rafael, CA (US)

(73) Assignee: Electrified Games, Inc., San Rafael, CA (US)

( * ) Notice: Subject to any disclaimer, the term of this patent is extended or adjusted under 35 U.S.C. 154(b) by 973 days.

(21) Appl. No.: 12/054,279

(22) Filed: Mar. 24, 2008

(65) Prior Publication Data

US 2008/0234049 A1 Sep. 25, 2008

Related U.S. Application Data

(60) Provisional application No. 60/896,742, filed on Mar. 23, 2007.

(51) Int. Cl.

*A63F 9/24* (2006.01)

*G06F 17/00* (2006.01)

(52) U.S. Cl. ................................ 463/31; 463/43; 463/47

(58) Field of Classification Search .............. 463/30–32, 463/40–44, 47

See application file for complete search history.

(56) References Cited

U.S. PATENT DOCUMENTS

| | | | | |
|---|---|---|---|---|
| 5,595,389 | A * | 1/1997 | Parulski et al. | 463/31 |
| 2002/0082082 | A1 * | 6/2002 | Stamper et al. | 463/32 |
| 2003/0181242 | A1 * | 9/2003 | Lee et al. | 463/42 |
| 2006/0014585 | A1 * | 1/2006 | Neogi | 463/42 |

* cited by examiner

*Primary Examiner* — David L Lewis

*Assistant Examiner* — Robert Mosser

(74) *Attorney, Agent, or Firm* — Orrick, Herrington & Sutcliffe, LLP

(57) ABSTRACT

A method and system for personalized digital game creation are disclosed. According to one embodiment, a computer-implemented method, comprises storing a plurality of customizable games. Each game of the plurality of customizable games has personalization slots. Media assets are received from a user computer. A personalized game is generated using the media assets and a customizable game of the plurality of customizable games.

2 Claims, 3 Drawing Sheets

METHOD AND SYSTEM FOR PERSONALIZED DIGITAL GAME CREATION

The present application claims the benefit of and priority to U.S. Provisional Patent Application No. 60/896,742 filed on Mar. 23, 2007, which is hereby incorporated by reference in its entirety.

FIELD

The field of the invention relates generally to computer networks and more particularly relates to a method and system for creating a personalized digital game.

BACKGROUND

Personalization or customization for digital content is wide spread thanks to the recent development of digital photography, image processing software and personal computers. Using digital cameras and microphones, people can easily take pictures, create sound clips and share such personal media assets on the Internet with others. With the increasing popularity of Web 2.0 and UCC (user created content), numerous online social networking sites such as MySpace, Facebook allow their users to upload personal media assets to create personalized Web pages of their own. Users create an Avatar (another self in a cyber space) showing their preferences and everi emotions to better express themselves. This way, users can communicate more personally and interactively.

With an increasing popularity with digital games, personalization to make the games more interactive and enjoyable has been tried to some extent. For example, a character in a game can be given a personalized name, which appears in the dialogs within the game instead of a default name. Users of Nintendo® Wii™ manufactured by Nintendo Corp., create their own Mii™, a game Avatar, who interacts with other Miis in a variety of ways. However, personalization in digital games is quite limited. In addition, personalization often requires the user to have specific knowledge about digital media and the manipulation thereof. Therefore, there is a need for an easier personalization tool or service that allows users to create and build personalized digital content, particularly a digital game.

SUMMARY

A method and system for personalized digital game creation are disclosed. According to one embodiment, a computer-implemented method, comprises storing a plurality of customizable games. Each game of the plurality of customizable games has personalization slots. Media assets are received from a user computer. A personalized game is generated using the media assets and a customizable game of the plurality of customizable games.

The above and other preferred features, including various novel details of implementation and combination of elements, will now be more particularly described with reference to the accompanying drawings. It will be understood that the particular methods and systems described herein are shown by way of illustration only and not as limitations. As will be understood by those skilled in the art, the principles and features described herein may be employed in various and numerous embodiments without departing from the scope of the invention.

BRIEF DESCRIPTION OF THE DRAWINGS

The accompanymg drawings, which are included as part of the present specification, illustrate the presently preferred embodiment of the present invention and together with the general description given above and the detailed description of the preferred embodiment given below serve to explain and teach the principles of the present invention.

Figure 1:
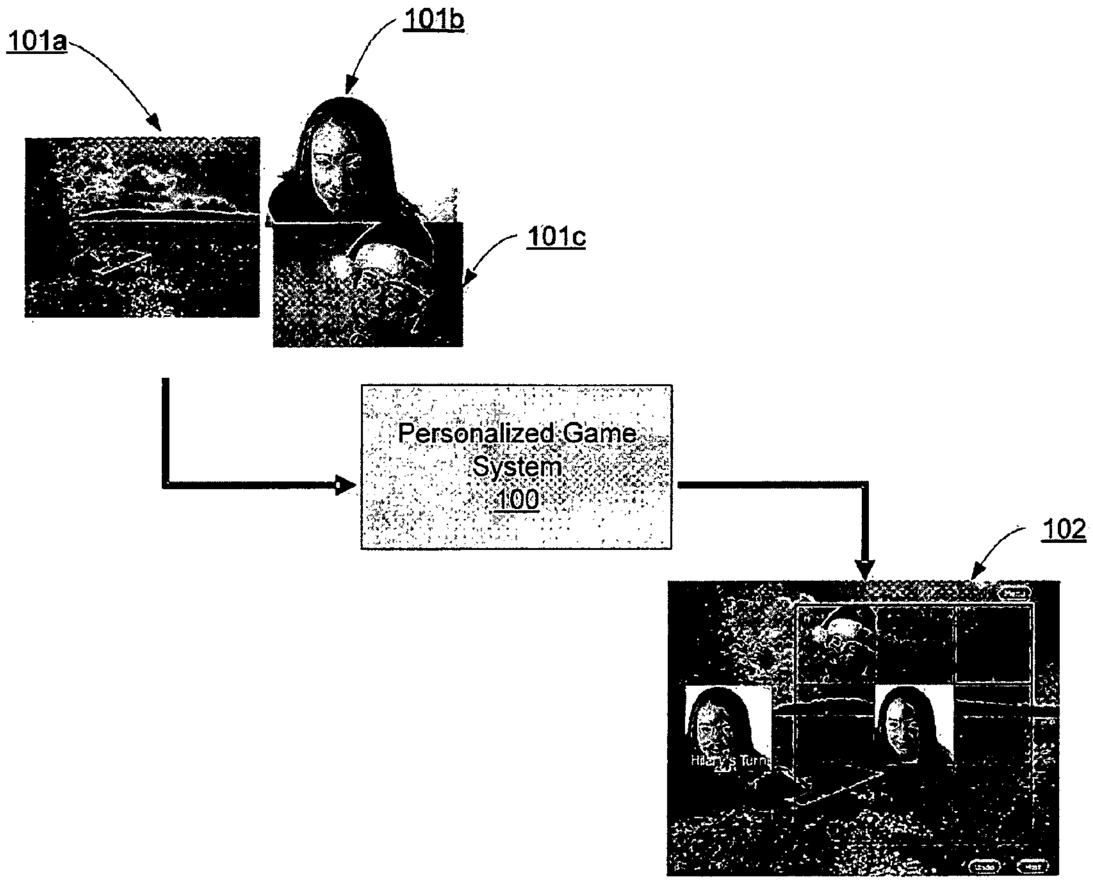
FIG. 1 illustrates an exemplary personalized game system, according to one embodiment.

It should be noted that the figures are not necessarily drawn to scale and that elements of similar structures or functions are generally represented by like reference numerals for illustrative purposes throughout the figures. It also should be noted that the figures are only intended to facilitate the description of the various embodiments described herein. The figures do not describe every aspect of the teachings disclosed herein and do not limit the scope of the claims.

DETAILED DESCRIPTION

A method and system for personalized digital game creation are disclosed. The present system gives users the ability to create personalized digital games. In order to facilitate this, the system provides a web-based service that allows end-users to create a customized version of a computer or video game, incorporating media assets provided by the user.

Each of the features and teachings disclosed herein can be utilized separately or in conjunction with other features and teachings to provide a method and system for vision-based interaction in a virtual environment. Representative examples utilizing many of these additional features and teachings, both separately and in combination, are described in further detail with reference to the attached drawings. This detailed description is merely intended to teach a person of skill in the art further details for practicing preferred aspects of the present teachings and is not intended to limit the scope of the claims. Therefore, combinations of features disclosed in the following detailed description may not be necessary to practice the teachings in the broadest sense, and are instead taught merely to describe particularly representative examples of the present teachings.

In the following description, for the purposes of explanation, specific nomenclature is set forth to facilitate an understanding of the various inventive concepts disclosed herein. However, it will be apparent to one skilled in the art that these specific details are not required in order to practice the various inventive concepts disclosed herein.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, and magnetic-optical disks, read-only memories, random access memories, EPROMs, EEPROMs, magnetic or optical cards, or any type of media suitable for storing electronic instructions, and each coupled to a computer system bus.

The methods presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

FIG. 1 illustrates an exemplary personalized game system 100, according to one embodiment. User 110 creates and/or uploads media assets 101 such as photos, audio clips and text to personalized game system 100. User 110 selects a game to personalize from a catalog of games provided by the personalized game system 100. After receiving a user 110's media assets and game selection, personalized game system 100 processes the user 110's request, builds a personalized game 102 in an appropriate format and delivers the personalized game 102 to the user 110. The personalized game 102 provides a unique and personalized user experience because it incorporates personal media assets. Personalized game system 100 has a web server 210, a request server 220 and a fulfillment server 230.

In creating a personalized game, user 110 provides content to be incorporated into a game. The content includes digital images, digital music or sound effects, personalized text, color selections, configuration settings, and the name or title of the game, which may appear on the title bar of the game and desktop of the user 110's computer.

According to one embodiment, media assets are selected from a catalog of "clip art" available to the public or are uploaded from the user 110's computer. Clip art that is purchased but licensed for a public/private use might be provided as a media asset to personalized game system 100.

Personalized game system 100 provides users 110 with a broad catalog of games for personalization: for example, classic board games such as 'Tic Tac Toe', 'Chess', 'Reversi' (Othello), 'Dots and Boxes', 'Go', 'Checkers' or 'Go Moku'; casual computer games such as 'Word Games', 'Solitaire', 'Freecell', 'Tetris', 'Text Twist', 'Minesweeper', or 'Bookworm', etc; arcade classic games such as 'Space Invaders', 'Breakout', 'Puzzle Bobble', 'Asteroids', 'Pac-Man', 'Dig Dug', 'Pong', 'Missile Command' or 'Qix'.

Fulfillment server 230 delivers a personalized game to user 110 through a number of different charmels including a downloadable installer, Web browser plug-in, CD-ROM or other physical media created on user 110's computer. The personalized game may be delivered to someone else as a gift.

Figure 2:
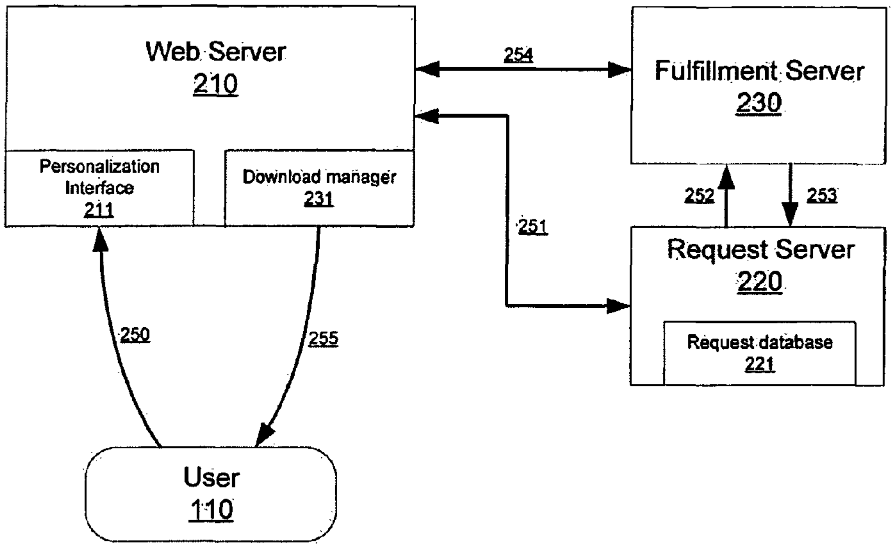
FIG. 2 illustrates a block diagram of an exemplary personalized game system, according to one embodiment.

FIG. 2 illustrates a block diagram of an exemplary personalized game system 100, according to one embodiment. User 110 visits a personalized game system 100. Web server 210 of the personalized game system 100 presents a list of personalizable games to user 110. After selecting a game to personalize, user 110 sends a request to personalize the game via a communication channel 250. The user's request is received by Web server 210 along with the media assets that the user 110 chose directly or indirectly. Personalized game system 100 creates a personalized game 100 and delivers it to user 110 through download manager 231 via a communication channel 255. Alternatively, user 110 requests a download of the personalized game 100 to download manager 231 after receiving a notification from personalized game system 100.

According to one embodiment, the architecture of personalized game system 100 allows for scaling individual components separately. For example, another fulfillment server can be added to distribute fulfillment process loads without changing architectures of the other components or subsystems. Personalized game system 100 may have an arbitrary number of request servers 220 and fulfillment servers 230. Web server 210 monitors the load of the request servers and routes each request to an appropriate request server to balance the load for requests. Similarly, the load of the fulfillment servers 230 may be properly balanced depending on the load for requests and the load of the request servers.

Web server 210 provides a user interface and instructions to use the personalized game service to users 110. According to one embodiment, Web server 210 may be implemented with diverse Web building tools such as Java, PHP and Flash, individually or collectively, and it is noted that other various forms of Web building tools can used without deviating the scope Of the present method and system. In addition, Web server 210 provides users 110 with tools for adjusting the settings of the game to be personalized. User 110 can preview the personalized game before making a decision to purchase the game. The previews can be shown as mock-up screen shots of the personalized game. Web server 210 also interacts with billing or e-commerce sites to handle the financial transaction that might occur during the purchase of the game. In this case, user 110 is given a user account and select a user password for accessing his/her account for later use. When user 110 provides media assets, Web server 210 packages and submits them to request server 220, where the media assets are processed and converted to an adequate format for delivery.

User 110 selects a game to personalize in many different ways. According to one embodiment, user 110 is shown a catalog of personalizable games on Web server 210 and selects a game. The games in the catalog may be shown with screen captures and sorted by category (e.g., puzzle, arcade) or theme (e.g., birthday, Valentine's Day). According to another embodiment, Web server 210 provides user 110 with demo games that are unpersonalized for evaluation. The demo games have a "personalize me" link that leads to a personalization site. According to yet another embodiment, the personalized game created by user 110 has a "make your own" link embedded in the game itself that leads to the personalization site without selecting a game from the catalog. According to yet another embodiment, user 110 provides media assets to Web server 210. Web server 210 uses the user-provided media assets to construct mock-up screen shots for several different games and presents them to user 110 for evaluation. User 110 previews the mocked-up games and selects a game to make a purchase. According to yet another embodiment, user 110 participates in a survey indicating his/her preferences of games and Web server 210 suggests a game based on the survey results.

User 110 can provide personal media assets to Web server 210 in various ways. According to one embodiment, user 110 uploads media asset files from his/her local computer via HTTP or FTP over a network. User 110 may capture media assets "on the spot" using the peripherals attached to his/her computer, such as cameras and microphones. Alternatively, user 110 views a movie on his/her computer and selects a frame or a sound clip of the movie as a media asset to personalize a game.

According to another embodiment, user 110 provides hyperlinks (e.g. uniform resource identifiers (URI)) to his/her media assets so that Web server 210 collects those media assets from the hyperlinks. According to yet another embodiment, user 110 provides media assets from a media sharing service such as Flickr, Shutterfly, etc.

According to yet another embodiment, user 110 enters keywords and Web server 210 aggregates relevant media assets to the user-provided keywords from the Intemet and provides them to user 110. User 110 selects from the Web server-provided media assets to personalize a game.

According to yet another embodiment, fulfillment server 230 provides a collection of media assets, clip art and other stock media assets. User 110 may select what he/she likes. According to yet another embodiment, user 110 selects a "theme" from a set of themes provided by Web server 210. Themes may be based on occasions (e.g., anniversary, mother's day), on topics (e.g., sports, wild west) or the like. Each theme provides a set of media assets as a starting point for personalization.

According to yet another embodiment, user 110 runs a software application provided by personalized game system 100 that scans his/her personal computer and finds media assets that are suitable for personalization. The scanning process occurs in the following order. The software application prompts user 110 for a game type as well as a set of directories or locations to scan. The user-selected directories are searched for media assets including image files (e.g., jpeg, png, gif) and sound files (e.g., mp, wav, ogg). The media files are then analyzed by the software for suitability based on dimensions, gradient magnitude, color histogram, presence of human faces or other objects that may be of importance. For the case of sound files, the software analyzes them for suitability based on playtime, frequency histogram, presence of voice or music. The suitable media assets are sent to request server 220 or a standalone version of fulfillment server 230 on the user's personal computer for creating preview screens. The preview screens are shown to the user and the user decides to modify the selection of media assets or continue to build a personalized game 102. The personalized game 102 is built by the fulfillment server 230—whether on personalized game system 100 or on the user's personal computer in the case of a standalone application—and delivered to the user for playing. In the case of a network delivery of the personalized game 102, user 110 is directed to the URI associated with the personalized game 102 for a network download.

According to yet another embodiment, user 110 selects a media asset available for purchase at an online media store (e.g., iTunes). Personalized game system 100 handles the purchase of the media asset from the online media store on behalf of user 110 such that user 110 needs not purchase the media asset and a game separately. The purchased media asset is incorporated into a personalized game and user 110 pays personalized game system 100 for the media asset as well as the game. User 110 selects the media asset to purchase and puts it in the Web server 210's shopping cart. Web server 210 then includes the price of the media asset into the price of the game. Fulfillment server 230 buys and downloads the media asset from the media store and the purchase media asset is used to build a personalized game.

According to one embodiment, Web server 210 uses software algorithms and artificial intelligence (AI) technology (e.g., machine vision, voice recognition) and suggests a game that suits the user-provided media assets. For example, face recognition software identifies several portrait photos from the user's personal computer and makes a suggestion for a user's profile slot in the game. Sound files are analyzed and sorted to give suggestions for sound slots in the game.

According to one embodiment, Web server 210 populates assets based on the media assets that user 110 provided. For example, Web server 210 prompts user 110 to enter the names of two players for a checkers game. User enters "Alice" and "Bob" as the names of the two players. The personalization interface 211 then generates text assets for the game (e.g., "It's Alice's turn" and "It's Bob's turn.") These text assets can be edited or replaced as user 110 desires. For another example, Web server 210 prompts user 110 to provide a player's portrait. Using the embedded image processing and composition tools, the personalization interface 211 generates a "victory portrait" and a "defeat portrait" based on the player's portrait. These images occupy separate image assets and can be edited or replaced as user 110 desires.

In addition to media assets, personalizing a game requires more selections from user 110. According to one embodiment, user 110 uses a form-based interface. The form-based interface gives user 110 a Web form to fill out and allows user 110 to select a media asset for each personalization slot in the game. Each game has predetermined personalization slots. The media assets for those personalization slots are either provided by user 110, or generated by personalization interface 211. For example, a checkers game has personalization slots for "player one piece image" and "player two piece image." For each slot, user 110 selects an image. For example, user may select the slots using a "drag-and-drop" interface by dragging media assets onto the personalization slots. According to one embodiment, user 110 uses a WYSIWYG interface. The WYSIWYG interface provides user 110 with a mock-up game screen. The game screen is initially unpersonalized and changes as user 110 selects media assets for the personalization slots. User 110 clicks on an element on the game screen, which corresponds to a personalization slot of the game, and selects a media asset for the element. Alternately, user 110 drags and drops media assets onto the game screen and personalization interface 211 assigns media assets to the appropriate personalization slots. The mock-up game screen may also display elements that represent sound events or text events, so that user 110 can use the WYSIWYG interface to edit such elements or events.

During the process of personalization, user 110 can edit his/her media assets. Web server 210's personalization interface 211 provides tools for editing media assets including scaling, cropping, and filtering of images, and truncation and filtering of sound effects. According to one embodiment, Web server 210 uses a set of rules and heuristics to determine whether any of the media assets need to be edited or modified to be easily incorporated into the game. For example, if an image's dimensions are in the wrong proportion or sized inappropriately for personalization slots, the linage is cropped and/or resized. If a sound clip is too long for the role it will serve in the game, the sound clip is truncated. If a text string is too long for the space it will fill in the game, the test string is shortened or rephrased. For these cases, personalization interface 211 provides user 110 an ability to edit the media asset. According to one embodiment, using software algorithms and AI tools, personalization interface 211 makes a suggestion to user 110 as to how the media asset is desired to be edited. For example, if a portrait image needs to be cropped, the personalization interface 211 uses a face recognition and suggests a crop rectangle to keep the face of the portrait image. The crop rectangle might be further resized to fit into the corresponding personalization slot.

After the personalization is done on agame, Web server 210 provides user 110 with a preview of the game before purchase. The preview of the game may come in various forms. According to one embodiment, mock-up game screen images are shown on Web Server 210. According to another embodiment, an interactive demo playable in user 110's Web browser is provided. The interactive demo may have time or feature limits if user 110 decides not to buy the game. Alternatively, a non-interactive demo is provided showing a machine player playing the game instead of the personalized player. It provides the look and feel of the game that user 110 would see in the personalized game with his/her own media assets in action but user 110 cannot play the personalized game until the game is purchased.

Once user 110 purchases the personalized game, Web server 210 communicates the personalization parameters in the form of an asset manifest. According to one embodiment, the asset manifest is an XML file that describes which assets are used in which slots of the game. The asset manifest is an internal filie that is not provided to user 110. In the case where a single asset occupies multiple asset slots, Web server 210 relates an optimized asset manifest that conserves storage by re-using the same asset. For example, an asset manifest looks like the following.

```
<resources>
    <string name="Author" value="MAHK" />
    <string name="Title" value="The Coolest Breakout Game Ever!" />
        <image name="GameBackground"
        src="default_background" />
        <sound name="Music" src="default_music" type="music" />
        <string name="LevelText_1" value="I am Cool!" />
        <string name="LevelText_2" value="You are Lame!" />
        <image name="LevelBackground_1" src="custom_level_1" />
        <image name="LevelBackground_2" src="custom_level_2" />
</resources>
```

If a personalization slot is not filled or deleted later on, the personalization slot might be given a default field.

Web server 210 provides a delivery service to deliver the game to its final destination. According to one embodiment, download manager 231 allows user 110 to download a game installer to user 110's personal computer. The game installer starts the download later on by making a download request to download manager 231. According to another embodiment, download manager 231 allows user 110 to download a utility that downloads the game and burns it onto a CD using user 110's CD-ROM burner.

Fulfillment server 230 performs a series of processes to build a personalized game. According to one embodiment, fulfillment server 230 performs a variety of data processing using various software applications written with, for example, Perl, VBScript, Visual Build, NSIS (Nullsoft Scriptable Install System), C++, etc. Fulfillment server 230 is responsible for pulling requests and assets from request server 220 via channels 252 and 253, assembling the personalized game and package it into final form suitable for delivery, delivering the personalized game to user 110 via channel 254. In the case of physical media fulfillment, fulfillment server 230 creates a personalized game on a physical media such as CD-ROM, and a human operator prepares and ships the personalized game to the user.

Figure 3:
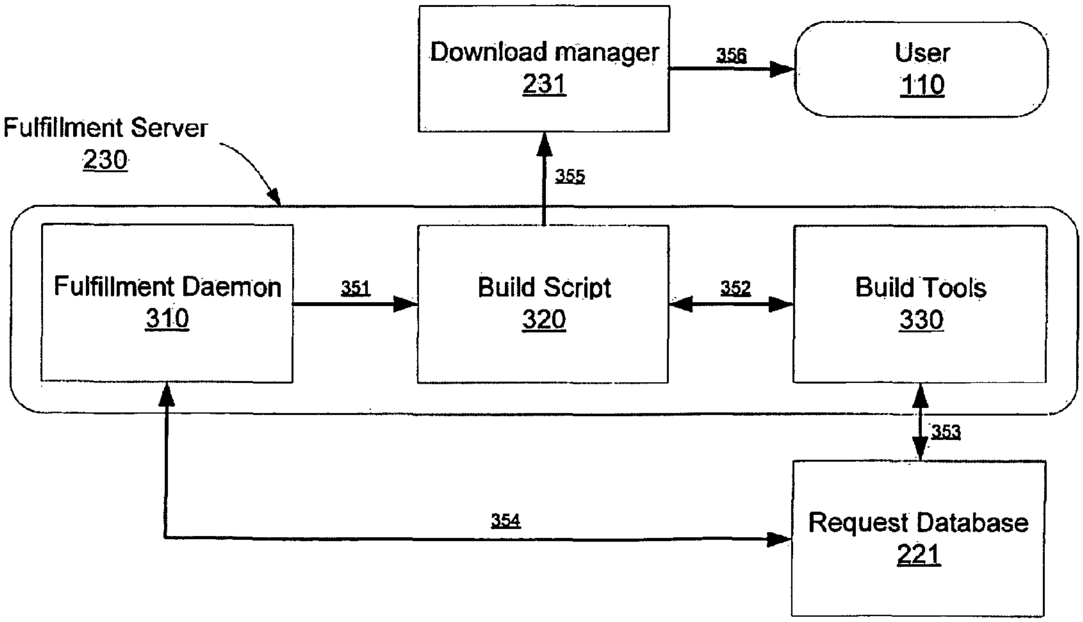
FIG. 3 illustrates an exemplary process for building a personalized game, according to one embodiment.

FIG. 3 illustrates an exemplary process for building a personalized game, according to one embodiment. Fulfillment daemon 310 queries request database 221 for a new request record. Each new request record is given a unique ID and other information about the user, game title, links to the media assets are tabularized in an appropriate format for reference. When a new request record arrives, fulfillment daemon 310 marks the new request record as 'pending' and starts a build process. Fulfillment daemon 310 computes a unique text "cookie" based on the request record's ID number and extracts all the asset files associated with the request to a directory. Fulfillment daemon 310 then launches a build script 320 by passing on the request record thereto via 351. Build script 320 packages the assets into a binary file to which the later built personalized game can access. According to one embodiment, the binary file is wrapped in a Digital Rights Management (DRM) wrapper so that the assets can only be accessed by the personalized game. Build script 320 then launches build tools 330 to build a personalized game. If necessary, build script 320 invokes a compiler to recompile the game's source code. Build script 320 then selects an archive compiler associated with the desired delivery format such as a browser plug-in (CAB or XPI format), a downloadable file (Installer EXE or MSI) or a CD-ROM (ISO format). According to one embodiment, build script 320 builds multiple packages in various formats.

In order to guarantee authenticity and security, build script 320 invokes a code signing utility to sign the game using a system code signing certificate.

After building a personalized game, build script 320 delivers the personalized game to download manager 231. When user 110 connects to Web server 210 through a network connection, download manager 231 resides in the Web server 210. Generally, download manager 231 refers to a mechanism that enables the delivery of the personalized game to user 110 in various ways. Additional plug-ins and downloadable files are also delivered to user 110 by download manager. In the case of physical media fulfillment, i.e., a physical media is created as a final deliverable product, ISOs (i.e. disk label images) are sent to a human operator who prepares and ships the final product to user 110. User-burned CD-ROMs are treated like downloadable files and Web server 210 or a separately-provided utility assists user 110 to burn on a CD-ROM.

According to one embodiment, after the game is prepared for delivery, build script 320 sends user 110 a notification (e.g., by an email) that the game is ready. The notification contains a Web link and delivery instructions. Build daemon 310 marks the game as 'ready' in request database 221.

According to one embodiment, personalized game system 100 may be deployed as a stand-alone application, rather than a Web-based service. Personalized game system 100 may be an end-user application, giving user 110 an ability to create a personalized game on his/her own computer without having an access to the Internet. Alternatively, personalized game system 100 may be built into a coin-operated kiosk that is installed at entertainment venues such as shopping malls and amusement parks. The kiosk uses a camera and a microphone to capture media assets to produces a game on the spot. The personalized game created on the spot may be delivered to user 110 on a physical media such as a CD-ROM or a USB thumb drive.

According to one embodiment, personalized game system 100 provides a "bot" application to user 110. The "bot" application automatically asseriibles a game request with a set of media assets stored on user 110's personal computer. The "bot" application identifies assets that are suitable for incorporation into a personalized game and assemble a game request on behalf of the user. The "bot" application may be applied in several ways. A "Web crawler bot" searches the Internet for media assets and builds them into games. Personalized game system 100 offers those personalized games for sale. For those media assets requiring licenses or purchases for distribution, personalized game system 100 may sign a license agreement with the asset's rightful owner to create games including such licensed assets. Alternatively, personalized game system 100 may collect license fees from the users and pays the asset's rightful owner after the payment for the media assets is collected.

According to another embodiment, the "Web crawler bot" builds a mock-up or demo game for a user 110 by searching the user 110's public assets on a social networking site (e.g., MySpace, Facebook) or a phoio sharing site (e.g., Flickr, Shutterfly) and offers the game to the user 110 via email or guestbook posting. According to one embodiment, the user 110's identity (e.g., email address) may be found from request database 221 when the user 110 signed up for the personalized game service. Using the user's identity, personalized game system 100 searches the Internet for the user's other Web pages and build a personalized game for the user and offers a free trial of the game.

According to yet another embodiment, the "bot" application is delivered to user 110's personal computer and it scans users 110's personal files for media assets to create a game request including the media assets.

According to one embodiment, personalized game system 100 includes a game sharing site where users 110 can share their games. The game sharing site is moderated for the adequacy of the content and for potential intellectual property issues. For example, Web server 210 offers community user tools for identifying offensive or infringing content from the game sharing site.

Another source of media assets for personalized games is online media stores such as iTunes. Personalized game system 100 interfaces with a online media store so that user 110 can request a commercially available song or video clip as an asset for a personalized game. In this case, personalized game system 100 acts as a media retailer and sells songs and media clips to user 110 as pre-packaged into the personalized game.

According to one embodiment, personalized game system 100 also creates non-game applications such as digital books, movies, digital "desk toys" (e.g. "throw tomatoes at this picture"), or photo albums.

Figure 4:
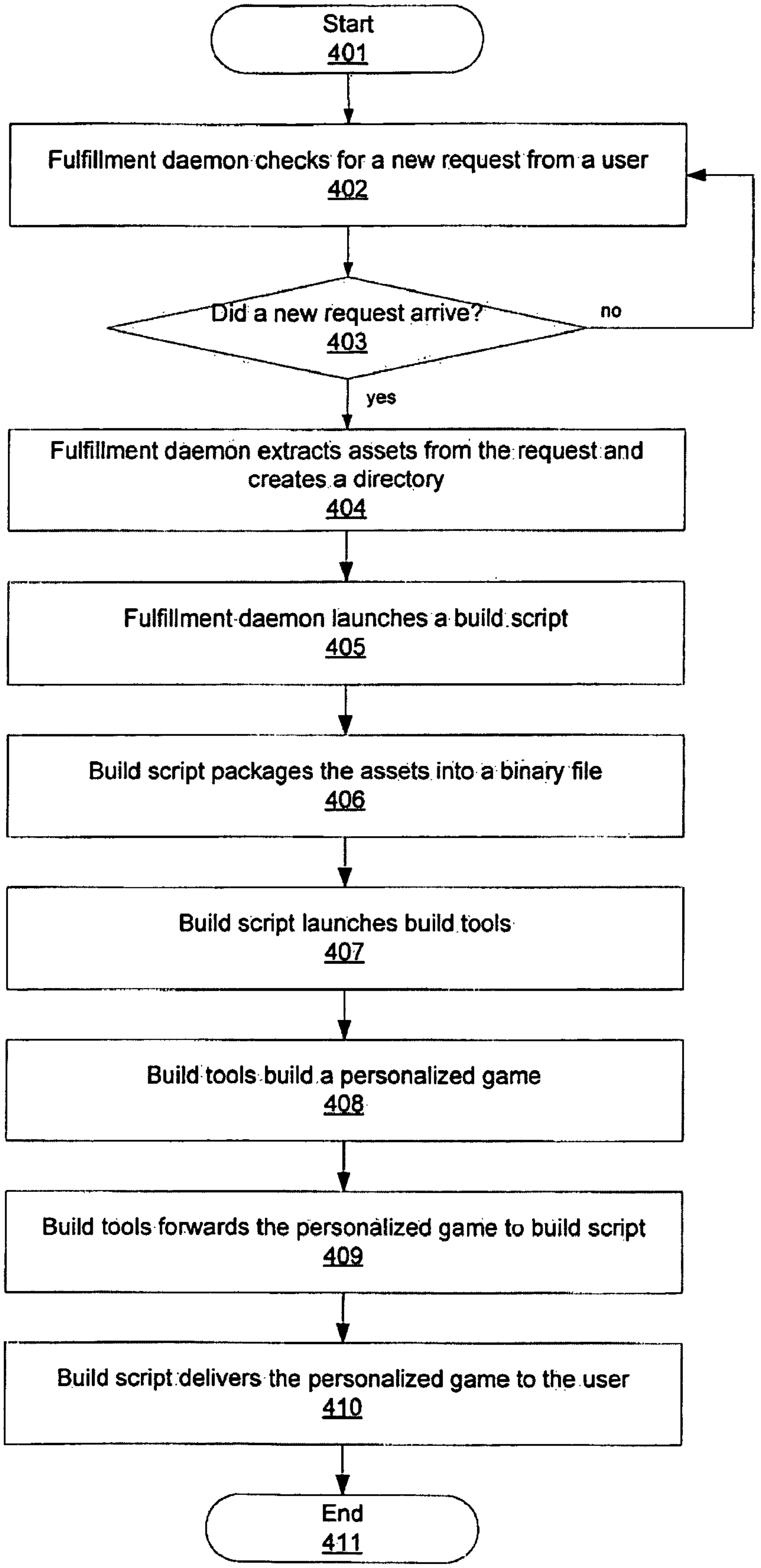
FIG. 4 illustrates an exemplary process for providing a personalized game service, according to one embodiment.

FIG. 4 illustrates ah exemplary process for providing a personalized game service, according to one embodiment. Fulfillment daemon 310 checks for an arrival of a new request from a user (402 and 403). The new request includes a set of media assets or links to those media assets, or an instruction for creating or linking media assets. After a new request arrives, fulfillment daemon 310 extracts or collects media assets associated with the request and creates a new directory to process the request (404). Thereafter, fulfillment daemon launches a build script (405). Build script creates a package including those media assets in a proprietary format, so that only the game that will be created later can access the media assets (406). The media assets are passed to build tools (407) and the build tools builds a personalized game tailored for the specific request by the user and the types of media assets (408). The personalized game is then forwarded back to the build script (409) and is delivered to the user (410).

According to one embodiment, game personalization is an automated process to sift through a set of media assets and choose suitable ones to insert into a personalized game 102 without a user input. Each media slot of a personalizable game has a description including information about what kinds of media assets are suitable. For example, an image media slot is appropriate for a landscape image, while a voice media slot is appropriate for a human voice saying "helo." Personalized game 102 might include several media slot templates that correlate certain media slots with other media slots. For example, one template for a tic-tac-toe game specifies that the "player-one" and "player-two" piece images are portraits and the background is a landscape. Personalized game 102 might have multiple media slot templates.

According to one embodiment, each media slot correlated with a media slot template has a suitability function. The suitability function takes an array of numerical parameters and produces a numerical suitability result. For example, the suitability function is a dot product of two vectors. It is noted that any computer algorithm may be used as a suitability function of a media slot without deviating the scope of the present method and system. Numerical parameters that are used for inputs to the suitability function are measured on media assets. For example, image media assets have numerical parameters such as the width and height in pixels, mean frequency or noise level, the frequency of occurrence of one particular color (e.g., blue, white, black), estimated number of faces, the percentage of the area occupied by faces, estimated number and area of other objects (e.g., cars, human bodies) and the likelihood that the image media asset is a landscape image. Sound media assets may have numerical parameters such as total duration, noise level, the number of human voices in the dialog, the quality of match against a specific spoken word (e.g., "hello" or "yeah!"), the percentage of duration devoted to music as opposed to speech, musical tempo, dynamic range and frequency range.

Personalized game system 100 analyzes media assets and determines the suitability of media slots based on a numerical suitability factor (e.g., percentage scale, 100% being the perfect match and 0% for not being able to use). Suitability analysis might depend on other user options. For example, user 110 might limit the number of usage of a particular media asset in a personalized game 102. If the usage for the media asset is limited to once, the suitability function determines the most suitable media slot for the media asset. If the media asset is used for multiple, media slots, the media slot with higher suitability factor is given the priority. In some cases, a collection of media assets are linked to a media slot, and a random or dynamic selection is made for the media slot. If user 110 chooses dynamic selection, the media assets are dynamically chosen from the collection as the personalized game 102 is being played.

An apparatus and method for personalized digital game creation has been described with respect to specific example and subsystems. It will be apparent to those of ordinary skill in the art that it is not limited to these specific examples or subsystems but extends to other embodiments as well.

We claim:

1. A computer-implemented method, comprising:

storing a plurality of customizable games, each game of the plurality of customizable games having personalization slots;

receiving media assets from a user computer; and generating a personalized game using the media assets and a customizable game of the plurality of customizable games;

wherein the user computer is a bot that automatically finds media assets on the Internet and generates the personalized game without user interaction.

2. A computer-readable medium having stored thereon a plurality of instructions, the plurality of instructions when executed by a computer, cause the computer to perform:

storing a plurality of customizable games, each game of the plurality of customizable games having personalization slots;

receiving media assets from a user computer; and generating a personalized game using the media assets and a customizable game of the plurality of customizable games;

wherein the user computer is a bot that automatically finds media assets on the Internet and generates the personalized game without user interaction.

* * * * *